(12) United States Patent
Chung et al.

(10) Patent No.: US 10,209,537 B2
(45) Date of Patent: Feb. 19, 2019

(54) METHOD AND APPARATUS FOR MONITORING AND CONTROLLING A PHOTONIC SWITCH USING PHASE SWEEPING

(71) Applicants: Ray Chung, Vancouver (CA); Zeqin Lu, Vancouver (CA); Hasitha Jayatilleka, Vancouver (CA); Mohammed Wadah Al Taha, Port Moody (CA); Sudip Shekhar, Vancouver (CA); Shahriar Mirabbasi, Vancouver (CA); Lukas Chrostowski, Vancouver (CA)

(72) Inventors: Ray Chung, Vancouver (CA); Zeqin Lu, Vancouver (CA); Hasitha Jayatilleka, Vancouver (CA); Mohammed Wadah Al Taha, Port Moody (CA); Sudip Shekhar, Vancouver (CA); Shahriar Mirabbasi, Vancouver (CA); Lukas Chrostowski, Vancouver (CA)

(73) Assignee: Huawei Technologies Canada Co., Ltd., Kanata (CA)

( * ) Notice: Subject to any disclaimer, the term of this patent is extended or adjusted under 35 U.S.C. 154(b) by 0 days.

(21) Appl. No.: 15/261,486

(22) Filed: Sep. 9, 2016

(65) Prior Publication Data
US 2018/0074386 A1 Mar. 15, 2018

(51) Int. Cl.
*G02F 1/01* (2006.01)
*G02F 1/313* (2006.01)

(52) U.S. Cl.
CPC .......... *G02F 1/0123* (2013.01); *G02F 1/3132* (2013.01); *G02F 1/3136* (2013.01); *G02F 1/3137* (2013.01); *G02F 2201/58* (2013.01)

(58) Field of Classification Search
CPC .......................... G02F 1/0123; G02F 2001/58
(Continued)

(56) References Cited

U.S. PATENT DOCUMENTS

| 5,805,328 A | * | 9/1998 | Satoh | G02F 1/0123 |
| | | | | 359/245 |
| 5,900,621 A | * | 5/1999 | Nagakubo | G02F 1/0123 |
| | | | | 250/205 |

(Continued)

FOREIGN PATENT DOCUMENTS

| JP | EP 2042913 A2 * | 4/2009 | ............ G06F 1/225 |
| JP | 201155330 | 3/2011 | |

OTHER PUBLICATIONS

Padmaraju et al., "Wavelength Locking and Thermally Stabilizing Microring Resonators Using Dithering Signals", Journal of Lightwave Technology, vol. 32, No. 3, Feb. 1, 2014, p. 505-512.

(Continued)

*Primary Examiner* — Robert Tavlykaev

(57) ABSTRACT

A method and apparatus for monitoring and feedback control of a photonic switch such as 2×2 Mach-Zehnder Interferometer switch. Optical signals at an input and an output of the switch are monitored via optical taps. A sinusoidal time-varying phase shift is applied to one of the monitoring signals. An optical combiner then combines the monitoring signals. A photodetector monitors output of the optical combiner to provide a feedback signal. The amplitude of the feedback signal due to the time-varying phase shift increases with the amount of input signal present in the output signal. When the input signal is to be routed to the output (e.g. for a bar state), a controller manipulates the switch to maximize feedback signal amplitude. When the input signal is to be routed to a different output (e.g. for a cross state), the controller manipulates the switch to minimize feedback signal amplitude.

24 Claims, 10 Drawing Sheets

(58) Field of Classification Search
USPC ............. 385/1–3, 9, 14–16, 21, 22, 42
See application file for complete search history.

(56) References Cited

U.S. PATENT DOCUMENTS

| | | | | |
|---|---|---|---|---|
| 6,091,535 | A * | 7/2000 | Satoh | G02F 1/0123 359/239 |
| 7,327,911 | B2 * | 2/2008 | Piede | G02F 1/025 385/129 |
| 8,041,228 | B2 * | 10/2011 | Charlet | G02F 1/0123 398/158 |
| 8,050,555 | B2 * | 11/2011 | McBrien | H04B 10/505 398/16 |
| 2002/0085811 | A1 * | 7/2002 | Kambe | G02F 1/3136 385/41 |
| 2013/0051723 | A1 * | 2/2013 | Sudo | G02F 1/0123 385/3 |
| 2015/0271576 | A1 | 9/2015 | Svilans et al. | |
| 2015/0316796 | A1 * | 11/2015 | Gill | G02F 1/225 385/3 |

OTHER PUBLICATIONS

Li et al., "Any Bias Point Control Technique for Mach—Zehnder Modulator", IEEE Photonics Technology Letters, vol. 25, No. 24, Dec. 15, 2013, p. 2412-2415.

Choi et al., "Modulation-Format-Free Bias Control Technique for MZ Modulator Based on Differential Phasor Monitor", OSA/OFC/NFOEC 2011.

Cho et al., Closed-Loop Bias Control of Optical Quadrature Modulator, IEEE Photonics Technology Letters, vol. 18, No. 21, Nov. 1, 2006, p. 2209-2211.

International Search Report and Written Opinion dated Sep. 1, 2017 for corresponding International Application No. PCT/CA2017/050746 filed Jun. 19, 2017.

* cited by examiner

METHOD AND APPARATUS FOR MONITORING AND CONTROLLING A PHOTONIC SWITCH USING PHASE SWEEPING

FIELD OF THE INVENTION

The present invention pertains to the field of photonic switches and in particular to a method and apparatus for monitoring and/or controlling photonic switches.

BACKGROUND

Photonic switches, such as Mach-Zehnder Interferometer (MZI) switches allow for the controllable routing of optical signals. Ongoing efforts are being made to design photonic integrated circuits (PICs) which incorporate potentially large numbers of such switches.

Switches based on the MZI architecture require correctly tuned control signals in order to operate with an adequately high extinction ratio. The MZI switch uses phase shifters to manipulate input optical signals. For example, a 2×2 MZI switch is operable in a cross configuration (in which first and second input signals are routed respectively to second and first outputs) and a bar configuration (in which first and second input signals are instead routed respectively to the first and second outputs). The control signal applied to the phase shifters determines whether the cross or bar configuration, or an intermediate mixture between the two configurations, is achieved.

However, factors such as manufacturing variability and environmental conditions can cause operating difficulties for a photonic switch such as an MZI switch. In particular, it can be difficult to determine control signal levels which will provide adequately pure cross and bar signals for a given photonic switch. Although it is possible to pre-tune (and possibly periodically re-tune) switches by injecting test signals and storing the control signal levels which provide the desired level of functionality, this requires a memory to store the control signal levels, and may also require the switch to be taken offline for tuning periodically.

Therefore there is a need for a method and apparatus for monitoring and controlling a photonic switch that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for monitoring and/or controlling photonic switches using phase sweeping and interference detection, and a photonic switch comprising same. In accordance with embodiments of the present invention, there is provided an apparatus for monitoring a photonic switch, such as a MZI switch. The apparatus includes first and second optical taps, a phase shifter, an optical combiner, and a photodetector. The first optical tap is located at an optical input of the photonic switch and provides a first monitoring signal indicative of a portion of a signal presented at the optical input. The second optical tap is located at an optical output of the photonic switch and provides a second monitoring signal indicative of a signal presented at the optical output. In some embodiments, the optical taps can extract portions of the presented optical signals and provide these extracted portions as the monitoring signals. The phase shifter is configured to apply a time-varying phase shift to the first monitoring signal or the second monitoring signal. The phase shift may be sinusoidal and at a frequency which is higher than the frequency of operation of the switch. The optical combiner is configured to combine the first monitoring signal and the second monitoring signal subsequent to application of the time-varying phase shift. The photodetector (e.g. a photodiode) is configured to provide a feedback signal indicative of power of light output by the optical combiner, the feedback signal having a characteristic correlated to, or indicative of, a current state of the photonic switch. The characteristic may include an amplitude of the feedback signal at the frequency of the time-varying phase shift, or at integer multiple of that frequency.

In accordance with embodiments of the present invention, there is provided an apparatus for controlling a photonic switch, comprising the apparatus for monitoring the photonic switch as described above, and an associated controller, such as an electronic analog and/or digital controller. The controller is configured to receive the feedback signal from the photodetector and to generate control signals for controlling the photonic switch based on the feedback signal and a desired state of the photonic switch. The desired state may be received by the controller at another input thereof. The controller may control the phase shifters of the switch, for example.

In some embodiments, when the desired state corresponds to the signal presented at the optical input being routed to the optical output, the controller is configured to adjust the control signals in order to maximize amplitude of the feedback signal. In some embodiments, when the desired state corresponds to the signal presented at the optical input differing from the signal presented at the optical output, the controller is configured to adjust the control signals in order to minimize amplitude of the feedback signal.

In accordance with embodiments of the present invention, there is provided a photonic switch comprising the apparatus for monitoring the photonic switch, or the apparatus for controlling the photonic switch, as described above.

In accordance with embodiments of the present invention, there is provided a method for monitoring a photonic switch. The method includes generating a first monitoring signal indicative of a signal presented at an optical input of the photonic switch. The method further includes generating a second monitoring signal indicative of a signal presented at an optical output of the photonic switch. The method further includes applying, using a phase shifter, a time-varying phase shift to the first monitoring signal or the second monitoring signal. The method further includes combining, using an optical combiner, the first monitoring signal and the second monitoring signal subsequent to application of the time-varying phase shift. The method further includes generating a feedback signal indicative of power of light output by the optical combiner, the feedback signal having at least one characteristic which is indicative of a current state of the photonic switch.

In accordance with embodiments of the present invention, there is provided a method for controlling a photonic switch. The method includes monitoring the photonic switch using the method as described above. The method further includes automatically generating control signals for controlling the photonic switch based on the feedback signal and a desired state of the photonic switch.

In accordance with embodiments of the present invention, there is provided an apparatus for monitoring a photonic switch. The apparatus comprises a first photodetector configured to provide an electrical first monitoring signal indicative of an optical signal presented at an optical input of the photonic switch. The apparatus further comprises a second photodetector configured to provide an electrical second monitoring signal indicative of an optical signal presented at an optical output of the photonic switch. The apparatus further comprises an electronic phase shifter configured to apply a time-varying relative phase shift between the first monitoring signal or the second monitoring signal. The apparatus further comprises an electronic combiner configured to combine the first monitoring signal and the second monitoring signal subsequent to application of the time-varying phase shift. The apparatus further comprises an output configured to provide a feedback signal indicative of signal power output by the electronic combiner, the feedback signal having a characteristic indicative of a current state of the photonic switch. The electronic components may be digital components, analog components, electrical circuits, components modelled using computer software executed on a microprocessor, or the like, or a combination thereof.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
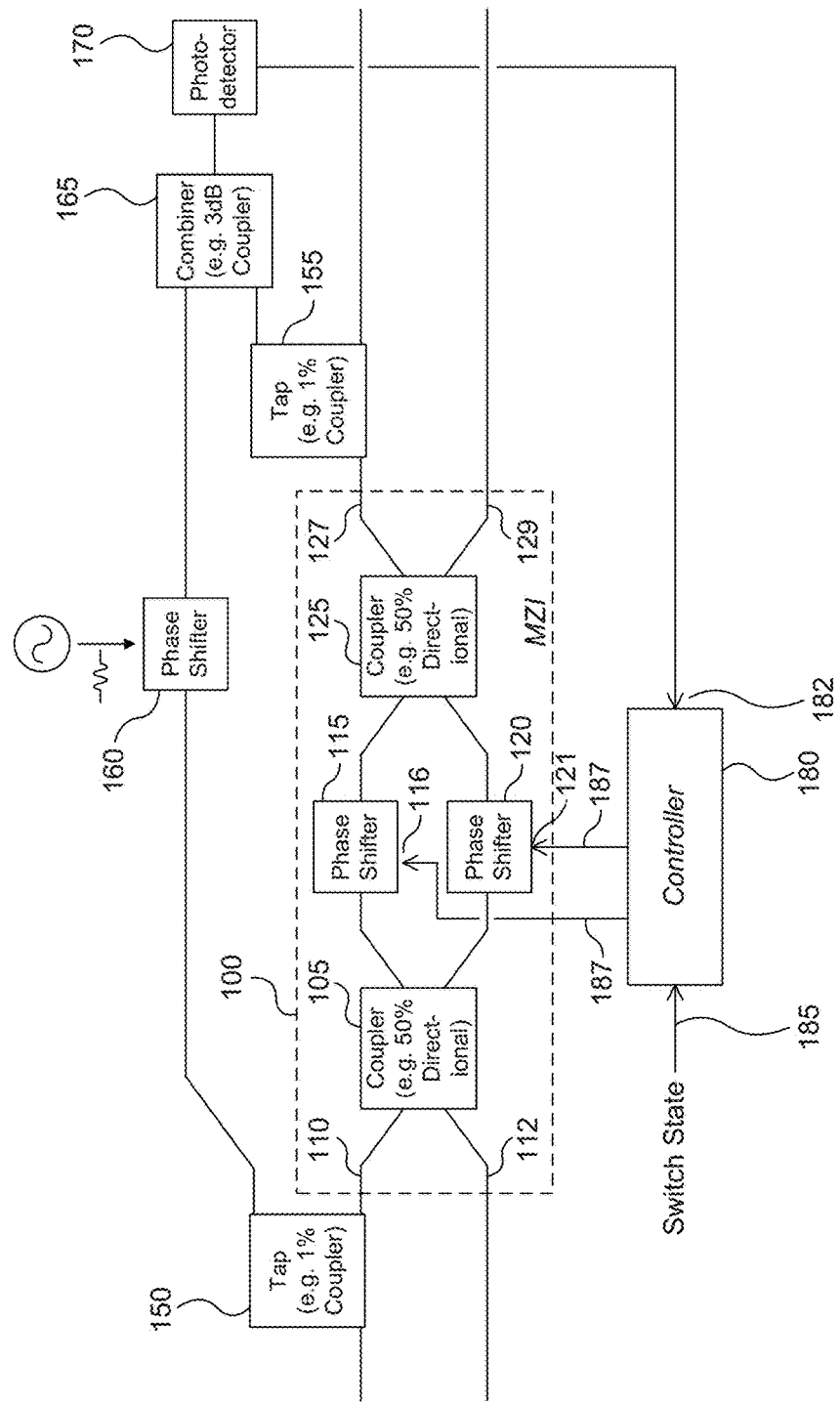
FIG. 1 illustrates a block diagram of a photonic MZI switch 100 and associated monitoring and control apparatus, in accordance with an embodiment of the present invention.

Embodiments of the present invention provide for a feedback-based or feed-forward-based method and apparatus for monitoring and controlling a photonic switch, such as a photonic switch based on an MZI-based architecture, or another type of photonic switch, such as a ring-based photonic switch or a MEMS-based photonic switch. In some embodiments, for example in the case of the MZI switch, the switch operates by applying one or more phase shifts to its input signals. The state of the optical switch is monitored as follows. A given input and a given output of the switch are monitored, for example by using optical taps to extract a portion of the optical signal at the input and a portion of the optical signal at the output. The extracted signals are referred to as monitoring signals. The optical signal at the given input and output are referred to as the input and output signals, respectively. A time-varying phase shift is applied to at least one of the monitoring signals, such that, when the input and output optical signals are the same (e.g. when the switch is in the bar state), the relative phase between the two monitoring signals is time varying. The monitoring signals are then combined, for example using an optical combiner, to produce a resultant signal. The resultant signal is measured, for example using a photodetector such as a photodiode. The measurement is referred to as a feedback signal. The feedback signal may be an electrical representation of the optical resultant signal, for example.

When the input signals differ sufficiently, the resultant signal (and the corresponding feedback signal) carries information about the state of the photonic switch. In particular, it is observed that, as more input signal is routed to the given output, the amplitude of the resultant signal increases. In other words, the amplitude of the resultant signal is a generally increasing function of the proportion of the input signal which occurs in the output signal. Thus, a characteristic of the feedback signal, such as its amplitude at a frequency of the time-varying phase shift, are indicative of a current state of the photonic switch.

Embodiments of the present invention provide for control of the photonic switch based on the feedback signal. For example, when it is desired to place the optical switch in a state for which the output signal carries as much as possible of the input signal (e.g. the bar state when the first input and first output are monitored), the control signals for operating the switch can be set to a value which maximizes the amplitude of the feedback signal. Conversely, when it is desired to place the optical switch in a state for which the output signal carries as little as possible of the input signal (e.g. the cross state when the first input and first output are monitored), the control signals for operating the switch can be set to a value which minimizes the amplitude of the feedback signal. In some embodiments, the control signals can therefore be set using a feedback control routine, based on the feedback signal amplitude.

Embodiments of the present invention provide for a photonic switch that can be controlled using feedback, while avoiding pre-calibration or the need to store optimal operating parameters in memory. Optical and/or thermal crosstalk may be mitigated due to the feedback control. The optical monitoring circuit is relatively simple and requires as little as one photodetector (e.g. photodiode) for implementation. The feedback control circuit may also be relatively simple and require relatively little area for implementation, for example due to its simplicity and possible lack of memory circuit.

FIG. 1 illustrates a block diagram of a photonic MZI switch 100 and associated monitoring and control apparatus, according to an embodiment of the present invention. The MZI switch 100 includes a first coupler 105 receiving optical signals from a pair of inputs 110, 112 and providing a pair of outputs to a pair of phase shifters 115, 120. The MZI switch may comprise components such as optical splitters, optical combiners, and optical phase shifters. The outputs of the phase shifters are provided to a second coupler 125, which provides optical signals at a pair of outputs 127, 129. The couplers 105 and 125 may be 50% directional couplers, multimode interferometers (MMIs), or the like. In some embodiments, one of the phase shifters 115, 120 may be omitted. By controlling the amount of phase shift applied by the phase shifters 115, 120, the switch 100 can be operated in either a cross state (in which the signal at the first input 110 is routed primarily to the second output 129 and the signal at the second input 112 is routed primarily to the first output 127), or a bar state (in which the signal at the first input 110 is routed primarily to the first output 127 and the signal at the second input 112 is routed primarily to the second output 129).

It is noted for definiteness that the inputs and outputs of the MZI switch are optical inputs and outputs, and that the directional couplers and phase shifters similarly receive optical signals as input, manipulate the optical signals in the optical domain, and provide optical signals as output, as will be readily understood by a person skilled in the art. Accordingly, the phase shifters 115, 120 include control inputs 116, 121 for receiving electrical control signals.

Although an MZI switch is illustrated in FIG. 1, it will be readily understood that other types of photonic switches may be used, provided that switch is such that the inputs and outputs can be tapped, a time-varying phase shift can be applied to the monitoring signals, and the output is indicative of the switch state.

FIG. 1 further illustrates a monitoring apparatus comprising a first tap 150, a second tap 155, a phase shifter 160, a combiner 165 and a photodetector 170. The first tap 150 is located at the first input 110 and provides (extracts) a portion of the signal presented at the first input 110, and the second tap 155 is located at the first output 127 and provides (extracts) a portion of the signal presented at the first output 127. The signals extracted by the first 150 and second 155 taps are the first and second monitoring signals, respectively. The amount of signal extracted by the optical taps 150 and 155 is desirably limited so as to mitigate insertion losses, but should be sufficiently high that the extracted signal portions can be adequately manipulated and detected given ambient noise levels and noise related to detection and processing devices and circuits (e.g. photodiode dark currents). In an example embodiment, the optical taps 150 and 155 extract about 1% of the signal. The taps 150 and 155 may therefore be 1% couplers, for example.

The phase shifter 160 receives the first monitoring signal provided by the first tap 150 and imparts a time-varying phase shift thereto. The phase shifter 160 may be a carrier injection phase shifter, for example. Alternatively, the phase shifter 160 may be a carrier depletion phase shifter, or a thermal (resistive) phase shifter. Other types of phase shifters may also be used, for example but not limited to quantum-confined Stark effect phase shifters or Franz-Keldish effect phase shifters. In various embodiments, the phase shifter 160 is configured so as to be capable of causing phase variation at a higher frequency than the phase shifters 115, 120 of the MZI switch 100, or at least at a higher frequency than the designated switching frequency of the MZI switch. This allows the phase shifter 160 to sweep through multiple cycles of periodic phase shift while the MZI switch state remains relatively constant.

The applied phase shift may vary in time according to a periodic waveform such as a sinusoid. Use of a sinusoid to drive the phase shifter 160 may provide for simplified signal processing and/or filtering. However, it is contemplated that other waveforms may be used to drive the phase shifter, such as triangular waves, square waves, sawtooth waves, or the like. However, it is noted that use of some non-sinusoidal waveforms, such as those with jump discontinuities, may cause harmonic distortion which may require addressing. The waveform may also be changed in time, for example adaptively.

In various embodiments, the frequency of applied phase shift is higher than the desired switching frequency of the switch and controller. This allows the feedback signal to cycle multiple times so that the controller can reliably monitor the amplitude response of the feedback signal due to changes to the switch control signals, for example peak-to-peak amplitude response. The frequency of the applied phase shift may also be configured based on size limitations of the electronic controller; a higher frequency leads to a smaller required filtering capacitor in the control circuitry.

In various embodiments, the amplitude of applied phase shift is selected so that the phase shift sweeps through an adequately high range. For example, in various embodiments it is desirable to select the amplitude so that the phase shift sweeps through a radians periodically. For this embodiment, an amplitude of the feedback signal at a frequency of the time variation of the phase shift may be detected. In some embodiments, the phase shift sweeps through $4\pi$ radians or more, periodically. The amplitude of the feedback signal can vary periodically due to this periodic phase shift sweep. For these latter embodiments, an amplitude of the feedback signal at an integer multiple of the frequency of the time variation of the phase shift may be detected.

It is noted that the phase shifter 160 can alternatively be located between the second tap 155 and the combiner 165, so that the phase shifter would receive the second monitoring signal provided by the second tap 155 and impart a time-varying phase shift thereto. Alternatively, a first phase shifter can be located between the first tap and the combiner, and a second phase shifter can be located between the second tap and the combiner, the two phase shifters imparting different, e.g. opposite, time-varying phase shifts. In either case, the relative phase shift between the two inputs to the combiner 165 is configured so as to vary in time.

The output of the phase shifter 160 and the output of the second tap 155 are provided to the combiner 165. The combiner 165 may be a "Y" junction, an optical 3 dB combiner, a 3 dB coupler, or the like. The combiner receives and combines the two monitoring signals (after subjecting one or both to time-varying phase shifting) into a single resultant signal provided at the output of the combiner.

The resultant signal from the combiner 165 is provided to a photodetector 170, such as a photodiode. The photodetector 170 acts as a transducer to convert the resultant signal from the optical domain to the electrical domain, thus providing an electrical feedback signal which tracks the resultant signal.

The photodetector provides the resultant signal to an input 182 of a controller 180. The controller comprises digital electronics or analog electronics, or a combination thereof. The controller may include elements such as filters, digital logic circuits, analog circuits, digital-to-analog converters, analog-to-digital converters, a microprocessor or microcontroller, a memory containing firmware and/or control parameters, or the like. The controller may be implemented as a CMOS integrated circuit, for example. The controller 180 may also include other inputs, such as an input 185 indicative of a current desired state of the photonic switch 100 (e.g.

cross state or bar state). The controller provides outputs 187, such as current or voltage signals, which are coupled to controllable components of the photonic switch 100, such as the phase shifters 115, 120. In some embodiments the controller also provides an adjustable control signal to the phase shifter 160 in order to adjust characteristics of the time-varying phase shift applied thereby.

The controller 180 is generally configured to generate and provide control signals to the photonic switch 100 (e.g. to the phase shifters 115, 120) in order to adjust its operation based on the feedback signal from the photodetector 170 and the current desired switch state at input 185.

It is noted that the taps 150, 155 and the combiner 165 may be purely optical components, and that the phase shifter 160 may be a photonic component which manipulates optical signals based on an electrical control signal. The different components of the monitoring apparatus may be operatively coupled via optical transmission media, such as waveguides. As such, the monitoring apparatus may be implemented as a photonic apparatus.

Alternatively, it is considered that some or all of the components of the monitoring apparatus can be replaced by electronic (digital and/or analog) equivalents. The taps may be coupled to or replaced by photodetectors such as photodiodes that generate electrical monitoring signals indicative of time-varying optical signals at the photonic switch inputs and outputs. The phase shifter may be an electronic device which manipulates the electrical monitoring signals, to apply a time-varying relative phase shift between the two monitoring signals. The combiner may be implemented as an analog or digital electronic component which combines electrical signals subsequent to application of the phase shift. An output may then provide a feedback signal indicative of signal power output by the electronic combiner, the feedback signal having at least one characteristics indicative of a current state of the photonic switch. In such embodiments, two photodetectors are provided at or instead of the taps 150, 155, and the phase shifter 160 and combiner 165 are implemented electronically. The photodetector 170 may be omitted or replaced by a different component such as a digital-to-analog converter, for example. This embodiment relies on a unique time-varying nature (envelope) of the incoming optical signal. The time-varying phase shifter and the electronic combiner together perform a correlation function of the input and output signals, enabling one to evaluate a magnitude of the input optical signal at the output. The apparatus can be implemented digitally by the controller (or a separate digital device) for example by performing a simulation of the optical monitoring apparatus using program instructions stored in memory. Alternatively, analog or digital components, or a combination thereof, electronically performing functions to the phase shifter and combiner can be provided in an electronic circuit, the output of which is provided to the controller.

In various embodiments, an electrical filter (e.g. an analog or electronic/digital filter) is provided within the controller or between the photodetector and the controller, in order to filter the feedback signal. For example, a high-pass filter may be provided between the photodetector and the controller or an effective high-pass filter may be implemented with the controller. An AC-coupled connection is therefore provided to the photodetector. This approach allows for monitoring of the photodiode's response to the time-varying phase shift. The high-pass filtering blocks DC drift which may occur on top of the AC varying signal. Such DC drift may obscure local minima and maxima being sought by the controller. In various embodiments, the filtering provides for discrimination of a single frequency tone corresponding to the time-varying sinusoidal phase shifts.

Figure 2:
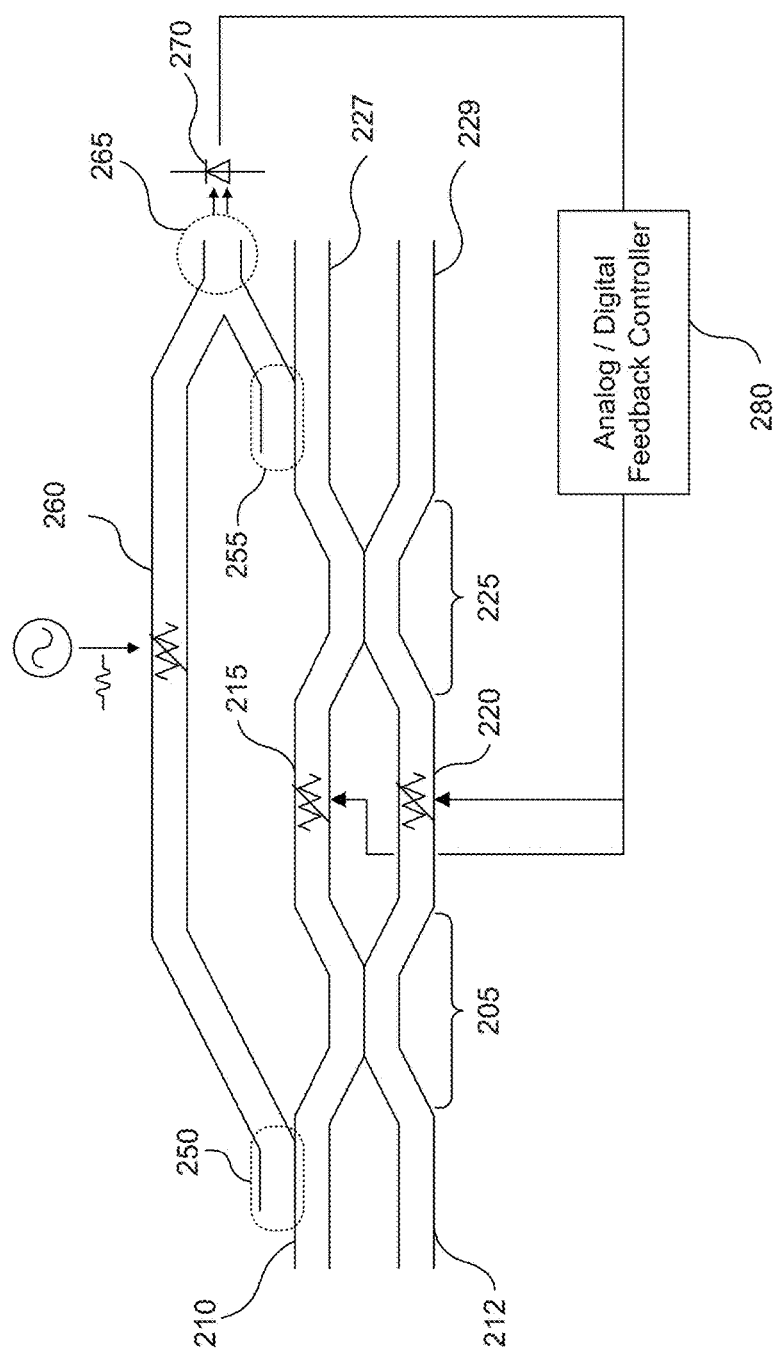
FIG. 2 schematically illustrates an implementation of the switch and apparatus of FIG. 1, in accordance with an embodiment of the present invention.

FIG. 2 schematically illustrates an implementation of the apparatus of FIG. 1, according to an embodiment of the present invention. An MZI switch includes a first directional coupler 205 receiving optical signals from a pair of inputs 210, 212 and providing a pair of outputs to a pair of phase shifters 215, 220. The outputs of the phase shifters are provided to a second directional coupler 225, which provides optical signals at a pair of outputs 227, 229. The monitoring apparatus comprising a first tap 250, a second tap 255, a phase shifter 260, a combiner 265 and a photodetector 270. The first tap 250 is located at the first input 210 and the second tap 255 is located at the first output 227. The phase shifter 260 receives output from the first tap 250 via an optical waveguide and the combiner 265 receives output from the phase shifter 260 and the second tap 255 via optical waveguides. The phase shifter 260 applies a periodically time-varying phase shift. The photodetector is coupled to an electronic feedback controller 280, which provides control signals to the phase shifters 215, 220.

Figure 3A:
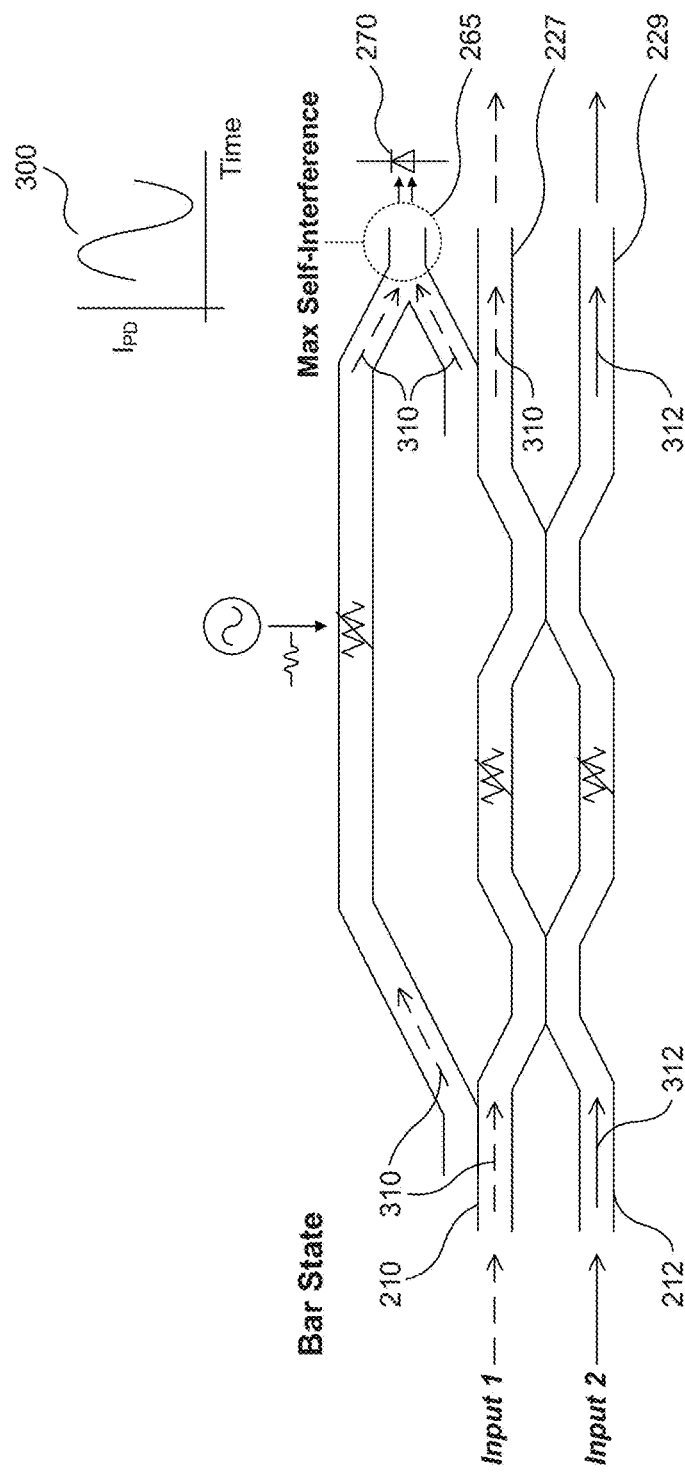
FIG. 3A illustrates operation of the apparatus of FIG. 2 in a bar state, in accordance with an embodiment of the present invention.

FIG. 3A illustrates an idealized operation of the apparatus of FIG. 2 in a bar state, according to an embodiment of the present invention. The signal applied to the first input 210, as well as monitoring signals which are derived from this signal, are represented by dashed arrows 310. The signal applied to the second input 212 is represented by a solid arrows 312. Because the switch is in the bar state, the signal 310 applied to the first input 210 also appears at the first output 227. As such, the first and second monitoring signals are both based on the signal 310 applied to the first input. This results in maximal self-interference at the combiner 265 and the photodiode 270, which manifests in a maximal amplitude of the output current $I_{PD}$ 330 of the photodiode 270 as a function of time.

Figure 3B:
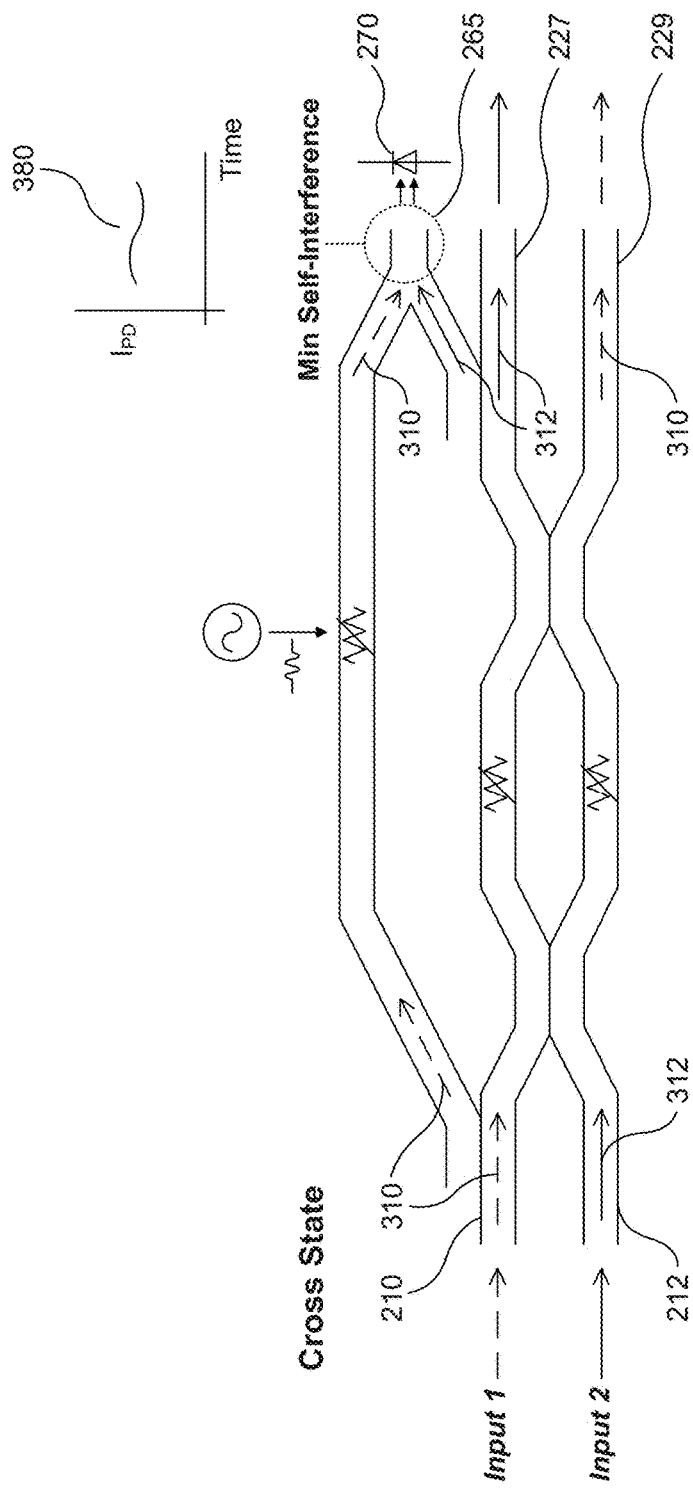
FIG. 3B illustrates operation of the apparatus of FIG. 2 in a cross state, in accordance with an embodiment of the present invention.

FIG. 3B illustrates an idealized operation of the apparatus of FIG. 2 in a cross state, according to an embodiment of the present invention. Because the switch is in the cross state, the signal 312 applied to the second input 212 now appears at the first output 227. As such, the first monitoring signal is based on the signal 310 applied to the first input, while the second monitoring signal is based on the signal 312 applied to the second input. This results in minimal self-interference at the combiner 265 and the photodiode 270, which manifests in a minimal amplitude of the output current $I_{PD}$ 380 of the photodiode 270 as a function of time.

FIGS. 3A and 3B illustrate a particular principle of operation of the present invention. When the two monitoring signals (after phase shifting) are combined at the combiner, the resultant signal can exhibit an oscillating behaviour. The degree of the oscillating behaviour is expressed as amplitude of the resultant signal, the resultant signal being indicative of a time-varying optical power resulting from optical interference of the two monitoring signals following phase shifting thereof.

In principle, two incoherent optical monitoring signals, or optical monitoring signals with different wavelengths, will minimally interfere with each other, regardless of their relative phase. On the other hand, if the two monitoring signals are identical except for a relative phase shift, they will constructively or destructively interfere to a degree which depends on the (relative) phase shift. If the relative phase shift is time-varying, the amount of optical interference will correspondingly vary in time. In addition, if the two monitoring signals are not identical, but the second monitoring signal includes a first portion which is derived from the first monitoring signal (and another portion (e.g.

derived from signal at input 212) which is independent), then the amount of time-varying optical interference will depend on the percentage of second monitoring signal that is made up of this first portion. The amount of time-varying optical interference between the two monitoring signals is expressed in the amplitude of the resultant signal (and hence of the feedback signal).

More specifically, the amount of time-varying interference between the two monitoring signals is expressed in an amplitude of the resultant/feedback signal. In some embodiments, the amplitude may relate specifically to component(s) of the resultant/feedback signal which is/are located at or around the frequency components of the applied time-varying phase shift.

Figure 4:
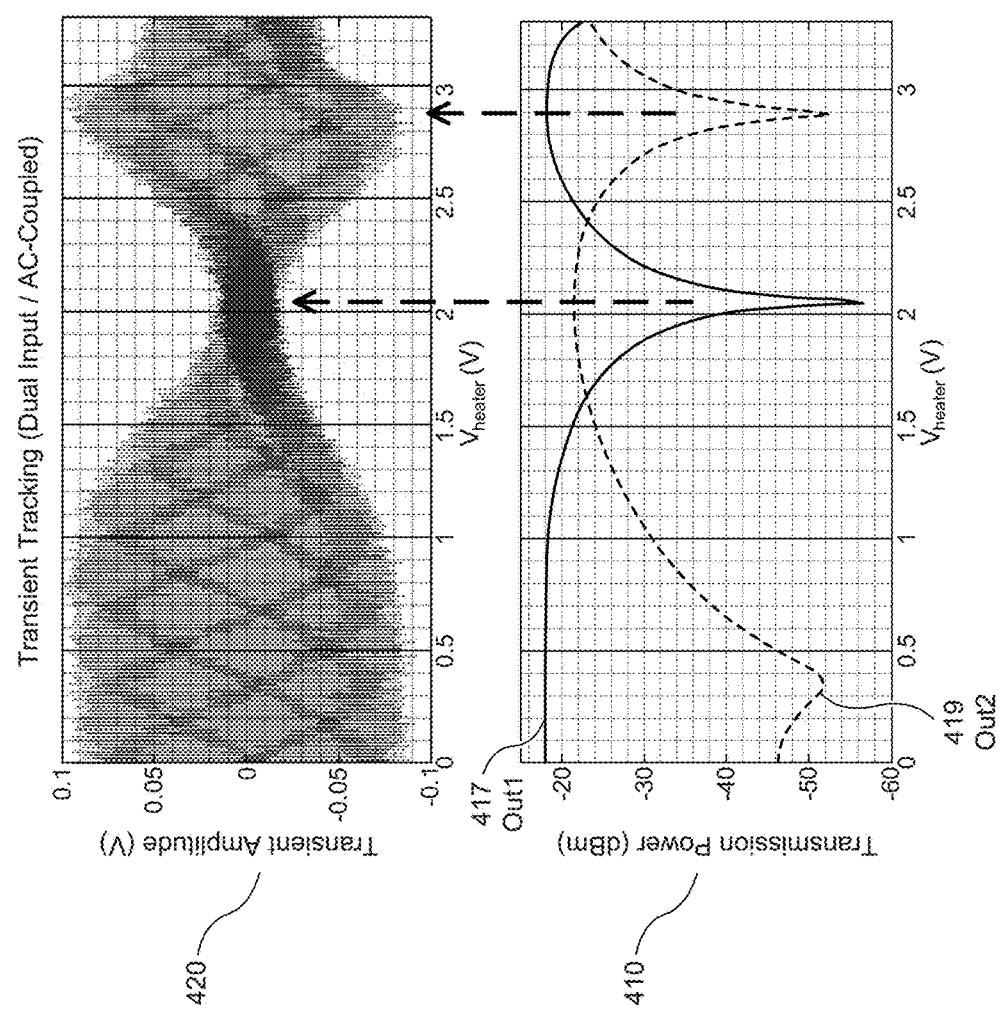
FIG. 4 graphically illustrates operation of a 2×2 photonic MZI switch and monitoring apparatus, in accordance with an embodiment of the present invention.

FIG. 4 graphically illustrates operation of a 2×2 photonic MZI switch and monitoring apparatus, according to an example embodiment of the present invention. The MZI switch and monitoring apparatus are a particular implementation of those illustrated in FIGS. 2, 3A and 3B. The lower graph 410 illustrates the transmission power 417, 419, measured in dBm, at the two outputs 227, 229 (respectively) of the MZI switch for a given reference signal applied to the first input 210 of the MZI switch. No reference signal is applied to the second input 212. The transmission power is displayed as a function of a voltage $V_{heater}$, which in the present example embodiment is a voltage applied to resistive phase shifters 215, 220 of the MZI switch, causing a particular amount of (relative) phase shift to be applied thereby. As is evident from the lower graph 410, at about $V_{heater}$=2.05 V, the power at the first output 227 is minimized and the power at the second output 229 is maximized, which corresponds to a cross state of the MZI switch. At about $V_{heater}$=2.8 V, the power at the first output 227 is maximized and the power at the second output 229 is minimized, which corresponds to a bar state of the MZI switch. Another bar state is achieved at about $V_{heater}$=0.36 V.

The upper graph 420 of FIG. 4 illustrates the output voltage of the photodetector 270 providing the feedback signal, with DC bias components removed (if present). The output voltage is again shown as a function of voltage $V_{heater}$, to facilitate comparison with the lower graph 410. In the present example embodiment, the feedback signal oscillates substantially sinusoidally at the frequency of the time-varying phase shift. The amplitude of the feedback signal varies with voltage $V_{heater}$. More particularly, the amplitude of the feedback signal varies with the amount of reference signal that is routed to the first output 227 by the MZI switch, in response to the phase shift applied thereby. As is evident from the upper graph 410, the feedback signal reaches a minimum amplitude when the MZI switch is in the cross state, and reaches a maximum amplitude when the MZI switch is in the bar state. Thus, the amplitude of the feedback signal provides an indication of the MZI switch state.

In view of the above, the controller can be configured to drive the switch by implementing a feedback control routine that attempts to maximize the feedback signal amplitude when it is desired to couple as much as possible of the signal at the monitored input onto the monitored output (e.g. to achieve the bar state in the implementation of FIG. 2), and to minimize the feedback signal amplitude when it is desired to couple as little as possible of the signal at the monitored input onto the monitored output (e.g. to achieve the cross state in the implementation of FIG. 2). The controller may be configured to receive a signal indicative of the current desired state for the switch, and may respond by selecting whether to maximize or minimize the feedback signal, as appropriate for achieving the desired state.

A variety of different maximization and minimization routines may be used. For example, hill-climbing algorithms or other algorithms which perturb the control signal and observe the response may be used to adjust the control signals in multiple steps in order to seek a local maximum or minimum. Adaptive incrementing may be incorporated into such perturb-and-observe algorithms. Other maximum power point tracking (MPPT) algorithms may also be used.

The amplitude may be derived from the feedback signal using low-pass filtering, amplitude, peak or envelope detection, or the like. In some embodiments, an envelope or peak detector receives the feedback signal, and the output of the envelope or peak detector is passed through a low-pass filter to extract the amplitude.

As noted above, for each desired switch state, the controller is configured to determine the control signals (e.g. voltage/current outputs to phase shifters) which realize the desired switch state, by monitoring the feedback signal and adjusting the control signals so as to induce a desired state in the feedback signal. In some embodiments, the controller can operate substantially continually in this mode, by continually monitoring the desired switch state and the feedback signal, and adjusting the control signals accordingly.

In some embodiments, the controller can store and use information to assist in more rapidly achieving the desired switch state. For example, for each possible switch state, the control signals which previously (optimally or adequately) achieved that state can be stored in memory. This data can be obtained during a training or calibration phase or during ongoing operation. When the desired switch state matches a previously realized state, the control signals can be initialized to their corresponding stored value. In some embodiments, the control signals are held at the stored value to realize the desired switch state without feedback. In other embodiments, the control signals are adjusted following initialization based on the feedback signal, in the manner already described above (e.g. to maximize or minimize the amplitude of the feedback signal). In yet other embodiments, the control signals are held at the stored value at some times, but are adjusted based on the feedback signal at other times, for example in order to periodically re-calibrate the controller due to possible drift in operating conditions.

Figure 5:
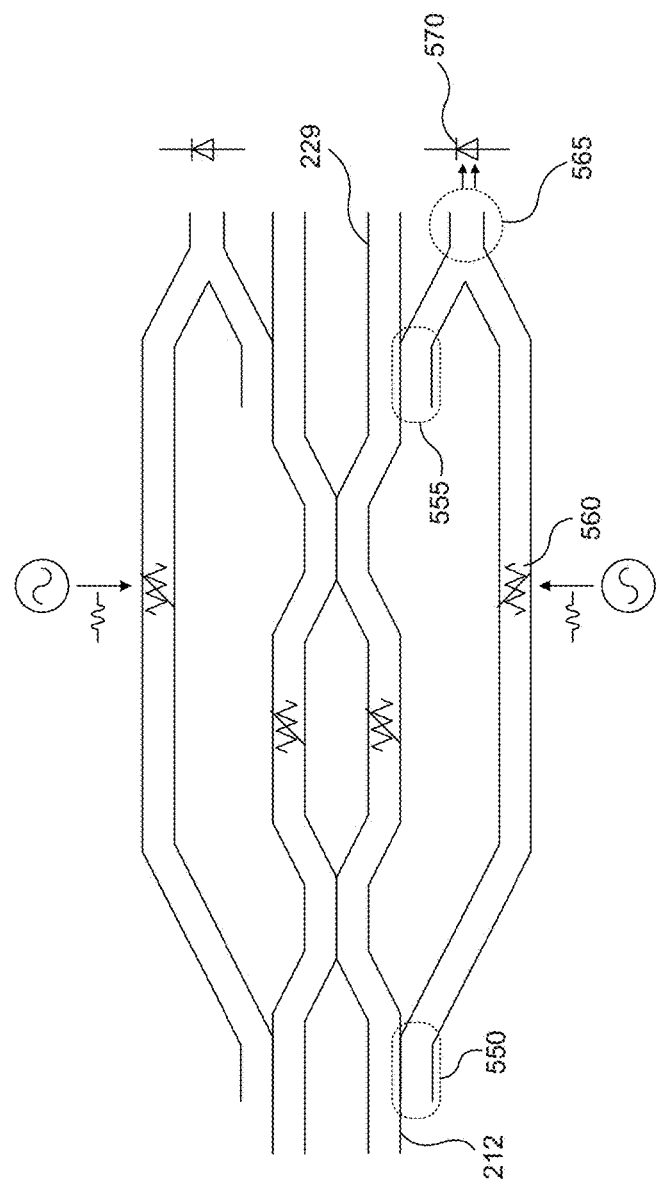
FIG. 5 illustrates a photonic MZI switch and a two-sided monitoring apparatus, in accordance with an embodiment of the present invention.

FIG. 5 illustrates a photonic MZI switch and associated monitoring apparatus according to another embodiment of the present invention. The controller is omitted for clarity, but will receive signals from both illustrated photodiodes and control the MZI switch based on same. The monitoring apparatus illustrated in FIG. 5 matches that of FIG. 2, except that the components of the monitoring apparatus are duplicated to monitor the second input and second output of the MZI switch. That is, in addition to the components described with respect to FIG. 2, the monitoring apparatus of FIG. 5 further comprises a third optical tap 550 located at the second optical input 212 of the photonic switch, and a fourth optical tap 555 located at the second optical output 229 of the photonic switch. The third optical tap 550 provides a portion of a signal presented at the second optical input as a third monitoring signal. The fourth optical tap 555 providing a portion of a signal presented at the second optical output as a fourth monitoring signal. The monitoring apparatus further comprises a second phase shifter 560 configured to apply a second time-varying phase shift to the third monitoring signal (as illustrated) or alternatively to the fourth monitoring signal. The monitoring apparatus further comprises second optical combiner 565 configured to combine the third monitoring signal and the fourth monitoring signal subsequent to application of the second time-varying phase shift. The apparatus further comprises a second photodetector 570 configured to provide a second feedback signal indicative of power of light output by the second optical combiner, the second feedback signal having at least one characteristic which is indicative of the current state of the photonic switch.

A potential advantage of the embodiment shown in FIG. 5 is that monitoring of the switch state is possible when there is no signal applied to the first input. Another potential advantage is that the loss due to the presence of optical taps is symmetric at both inputs and at both outputs. However, the embodiment of FIG. 5 requires more components than that of FIG. 2.

The control routine for the switch illustrated in FIG. 5 can include, for example, operating two control routines in parallel, one control routine being operated based on each photodiode signal received. The outputs of the control routines can be averaged, for example. When a lack of signal at one of the inputs is detected, the control routine depending on that input can be suspended.

Figure 6:
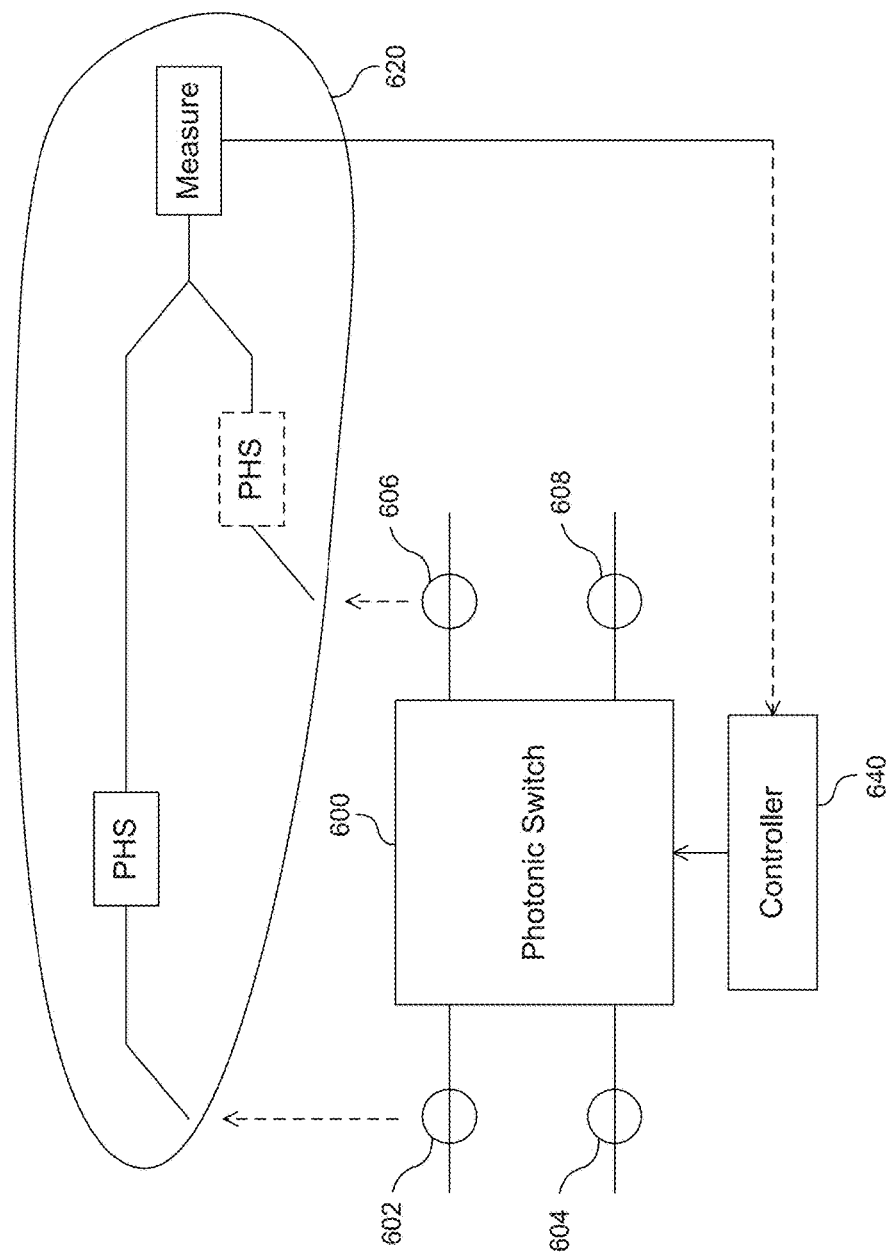
FIG. 6 illustrates a 2×2 photonic switch and associated monitoring and control apparatus, in accordance with an embodiment of the present invention.

FIG. 6 illustrates a 2×2 photonic switch 600 and associated monitoring and control apparatus according to yet another embodiment of the present invention. Four potential tap locations 602, 604, 606, 608 are shown. Up to four different instances of the monitoring apparatus can be provided as follows. A generic one of the possible monitoring apparatuses 620 is illustrated, with its inputs coupled to two selected tap locations and its output coupled to a controller 640. A first possible monitoring apparatus has its first optical tap at the upper input tap location 602 and its second optical tap at the upper output tap location 606. (This configuration resembles that of FIG. 1.) A second possible monitoring apparatus has its first optical tap at the lower input tap location 604 and its second optical tap at the lower output tap location 608. A third possible monitoring apparatus has its first optical tap at the upper input tap location 602 and its second optical tap at the lower output tap location 608. A fourth possible monitoring apparatus has its first optical tap at the lower input tap location 604 and its second optical tap at the lower output tap location 606. The third and fourth possible monitoring apparatuses allow for positive detection of input signal components in the output signal when the switch 600 is in the cross state. This in turn allows a maximization routine (i.e. to maximize the amplitude) to be used for driving the switch 600 to the cross state rather than using a minimization routine. However, the physical layout required to implement the third and fourth possible monitoring apparatuses may require the use of optical crossovers.

In one embodiment, a single monitoring apparatus 620 is switchably coupled to different selectable tap locations. This is feasible for example if the monitoring apparatus 620 is provided using electronic rather than optical components.

Figure 7:
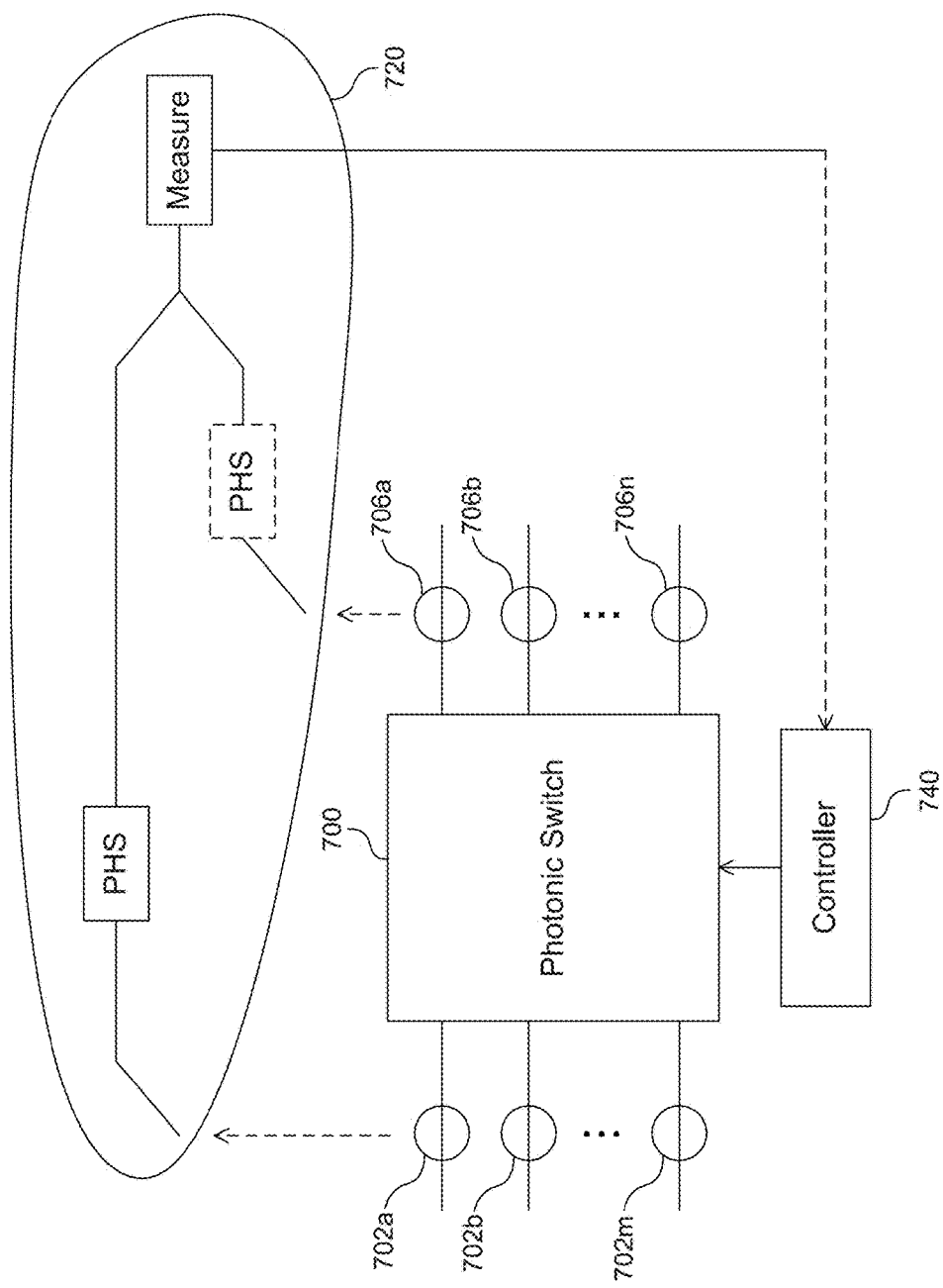
FIG. 7 illustrates a photonic switch with M inputs and N outputs, in accordance with an embodiment of the present invention.

FIG. 7 illustrates a photonic switch 700 with M inputs and N outputs, according to yet another embodiment of the present invention. M need not equal N; both M and N are greater than or equal to one and one of M and N are greater than or equal to two. To avoid potential signal crosstalk, M may be set less than or equal to N in various embodiments. M potential input tap locations 702a, 702b, . . . 702m and N potential output tap locations 706a, 706b, . . . 706n are illustrated. Up to M times N different instances of the monitoring apparatus can be provided, subject to practical limitations such as tap loss and layout complexity limitations. Each monitoring apparatus 720 has its first optical tap at one of the input tap locations 702a, 702b, . . . 702m and its second optical tap at one of the output tap locations 706a, 706b, . . . 706n. Outputs of the monitoring apparatus 720 are provided to the controller 740.

It is noted that an M×N photonic switch can be implemented using a plurality of 2×2 photonic switches in combination. In some embodiments, therefore, an M×N photonic switch may be provided which comprises at least one sub-component photonic switch (such as a 2×2 switch), which comprises a monitoring and control apparatus as described herein.

The control routine for the switch illustrated in FIG. 6 or FIG. 7 can include for example, operating multiple control routines in parallel, one control routine being operated based on each photodiode signal received. The outputs of the control routines can be averaged, for example. When a lack of signal at one of the inputs is detected, the control routine depending on that input can be suspended. In some embodiments, when the desired switch state can be achieved by one (or more) of the control routines by maximizing rather than minimizing its corresponding feedback signal, those control routines can take precedence or be more heavily weighted than other control routines which are required to achieve the desired switch state by minimizing their corresponding feedback signals. This may be beneficial in order to avoid minimization routines which may be more susceptible to noise.

Figure 8:
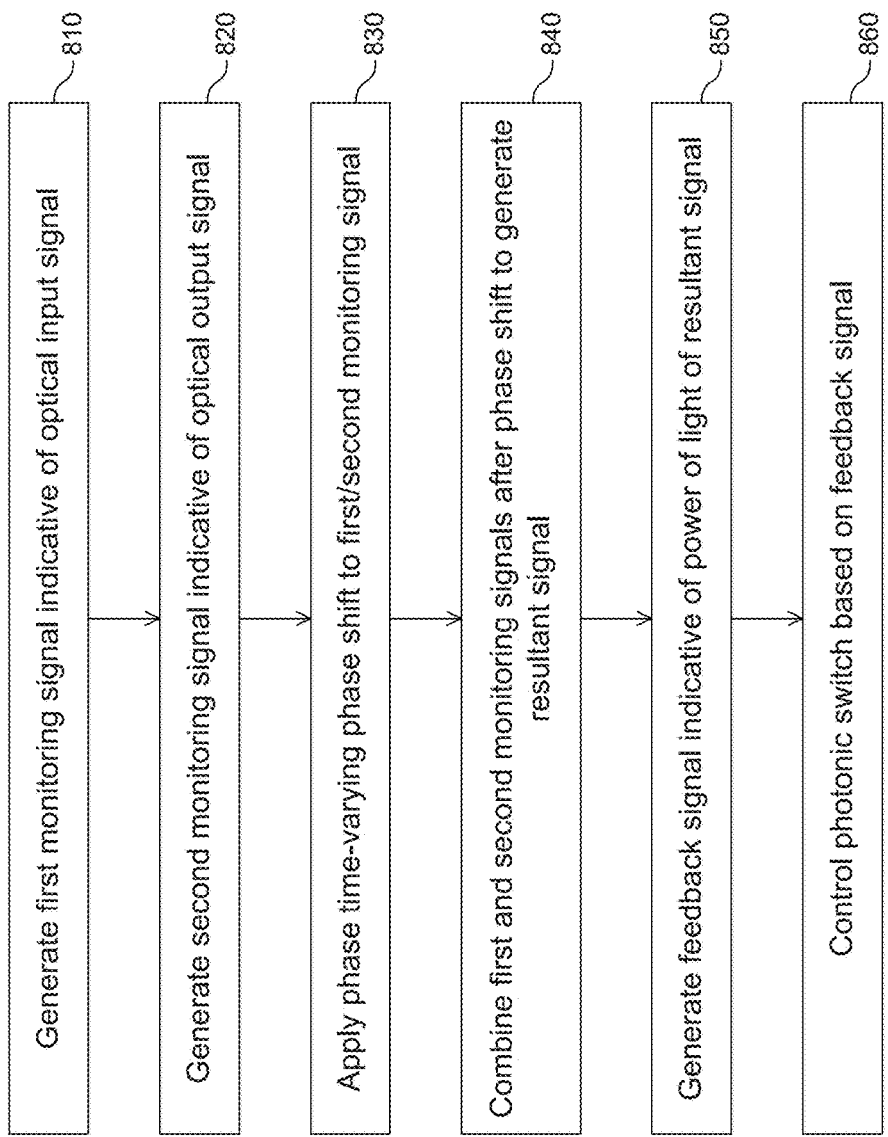
FIG. 8 illustrates a method for monitoring and controlling a photonic switch, in accordance with an embodiment of the present invention.

FIG. 8 illustrates a method for monitoring and controlling a photonic switch, such as an MZI switch, according to an embodiment of the present invention. The method includes generating 810 a first monitoring signal indicative of a signal presented at an optical input of the photonic switch, and generating 820 a second monitoring signal indicative of a signal presented at an optical output of the photonic switch. Generating the monitoring signals may include obtaining portions of the signals using optical taps. The method further includes applying 830, using a phase shifter, a time-varying phase shift to the first monitoring signal or the second monitoring signal. The method further includes combining 840, using an optical combiner, the first monitoring signal and the second monitoring signal subsequent to application of the time-varying phase shift. The method further includes generating 850 a feedback signal indicative of power of light output by the optical combiner. The feedback signal has at least one characteristic which is indicative of a current state of the photonic switch. The method may further include controlling 860 the photonic switch based on the feedback signal and a desired state of the photonic switch. Operations 810, 820, 830 and 840 may be performed using optical/photonic components, rather than electronic components.

Figure 9:
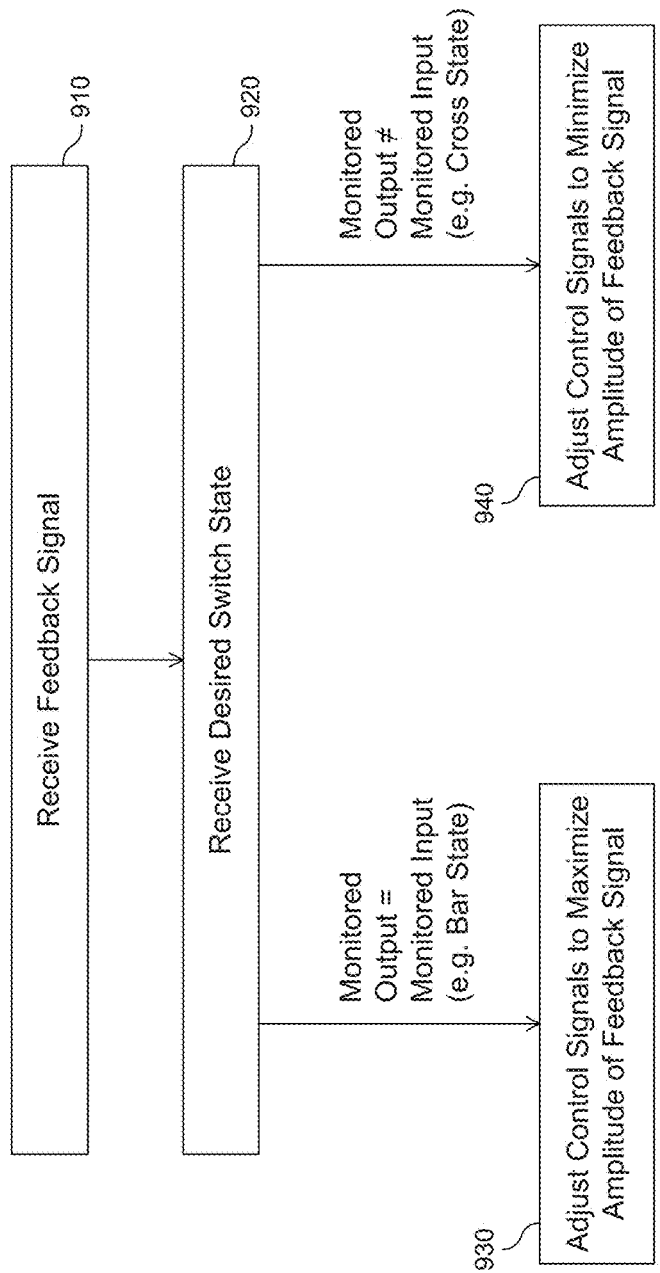
FIG. 9 illustrates a method for monitoring and controlling a photonic switch, in accordance with another embodiment of the present invention.

FIG. 9 illustrates a method for controlling a photonic switch, according to another embodiment of the present invention. The method includes receiving 910 the feedback signal, for example from the photodetector of the monitoring apparatus. The method further includes receiving 920 the current desired switch state, which may be for example a bar state or a cross state of a 2×2 MZI switch. The method further includes, when the desired state corresponds to the signal presented at the monitored optical input being routed to the monitored optical output (e.g. the bar state), generating the control signals by adjusting 930 the control signals in order to maximize amplitude of the feedback signal. The method may further include, when the desired state corresponds to the signal presented at the monitored optical input being routed to a different optical output than the monitored optical output (e.g. the cross state), generating the control signals by adjusting 940 the control signals in order to minimize amplitude of the feedback signal. The control signals may be drive signals for adjusting phase shifters of the MZI switch, for example.

In various embodiments, multiple ground pads are provided in order to mitigate electrical crosstalk. For example, ground pads electrically coupled to different phase shifters can be separated.

In some embodiments, it is noted that the thermal time constant of resistive phase shifters (of the photonic switch itself) limits the controller speed, and that the resistance sets the drive current. Therefore, larger resistance can be used to reduce the required drive current, which in turn may stabilize the power supply.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. An apparatus for controlling a photonic switch for controllably routing optical signals, the photonic switch having a first coupler optically coupled to at least first and second optical inputs, a phase shifter section optically coupled to the first coupler, and a second coupler optically coupled to the phase shifter section and providing optical signals to at least first and second optical outputs, the apparatus comprising:
    a first optical tap located at the first optical input of the photonic switch prior to the first coupler, the first optical tap providing a first monitoring signal indicative of a signal present at the first optical input;
    a second optical tap located at the first optical output of the photonic switch after the second coupler, the second optical tap providing a second monitoring signal indicative of a signal present at the first optical output;
    a first phase shifter configured to apply a time-varying phase shift between the first monitoring signal and the second monitoring signal;
    an optical combiner configured to combine the first monitoring signal and the second monitoring signal subsequent to application of the time-varying phase shift;
    a photodetector configured to provide a feedback signal indicative of power of light output by the optical combiner, the feedback signal having a characteristic indicative of a current state of the photonic switch; and
    a controller configured to receive the feedback signal and to generate a control signal for controlling the photonic switch, the control signal generated based on a combination of the feedback signal and an input signal indicative of a desired state of the photonic switch.

2. The apparatus of claim 1, wherein the photonic switch is a Mach-Zehnder Interferometer switch.

3. The apparatus of claim 1, wherein the photonic switch is a 2×2 switch.

4. The apparatus of claim 1, wherein a time variation of the phase shift is sinusoidal.

5. The apparatus of claim 1, wherein the characteristic comprises an amplitude of the feedback signal at a frequency of a time variation of the phase shift.

6. The apparatus of claim 1, wherein the characteristic comprises an amplitude of the feedback signal at an integer multiple of a frequency of a time variation of the phase shift.

7. The apparatus of claim 1, wherein the phase shifter is a thermal phase shifter, a carrier injection phase shifter, a carrier depletion phase shifter, a quantum-confined Stark effect phase shifter, or a Franz-Keldish effect phase shifter.

8. The apparatus of claim 1, further comprising:
    a third optical tap located at the second optical input of the photonic switch, the third optical tap providing a third monitoring signal indicative of a signal present at the second optical input;
    a fourth optical tap located at the second optical output of the photonic switch, the fourth optical tap providing a fourth monitoring signal indicative of a signal present at the second optical output;
    a second phase shifter configured to apply a second time-varying phase shift between the third monitoring signal and the fourth monitoring signal;
    a second optical combiner configured to combine the third monitoring signal and the fourth monitoring signal subsequent to application of the second time-varying phase shift; and
    a second photodetector configured to provide a second feedback signal indicative of power of light output by the second optical combiner, the second feedback signal having a second characteristic indicative of the current state of the photonic switch.

9. A photonic switch comprising the apparatus of claim 8.

10. The apparatus of claim 1, wherein the time-varying phase shift is configured to vary at a frequency which is higher than a desired switching frequency of the photonic switch.

11. The apparatus of claim 1, wherein, when the desired state corresponds to the signal present at the first optical input being routed to the first optical output, the controller is configured to adjust the control signals in order to maximize an amplitude of the feedback signal at a frequency of a time variation of the phase shift or at an integer multiple of the frequency.

12. The apparatus of claim 1, wherein, when the desired state corresponds to the signal present at the first optical input differing from the signal present at the first optical output, the controller is configured to adjust the control signals in order to minimize an amplitude of the feedback signal at a frequency of a time variation of the phase shift or at an integer multiple of the frequency.

13. A photonic switch comprising the apparatus of claim 1.

14. The apparatus of claim 1, wherein the controller is configured to generate the control signal to cause the photonic switch to route the signal present at the first optical input to the first optical output in response to the desired state being a first desired state, and wherein the controller is configured to generate the control signal to cause the photonic switch to route the signal present at the first optical input to the second optical output in response to the desired state being a second desired state.

15. The apparatus of claim 1, wherein the controller is configured to apply the control signal to the phase shifter section to drive the photonic switch to the desired state based on the feedback signal.

16. A method for monitoring a photonic switch for controllably routing optical signals, the photonic switch having a first coupler optically coupled to at least first and second optical inputs, a phase shifter section optically coupled to the first coupler, and a second coupler optically coupled to the phase shifter section and providing optical signals to at least first and second optical outputs, the method comprising:
    generating a first monitoring signal indicative of a signal present at the first optical input of the photonic switch prior to the first coupler;

generating a second monitoring signal indicative of a signal present at the first optical output of the photonic switch after the second coupler;

applying, using a first phase shifter, a time-varying phase shift to between the first monitoring signal and the second monitoring signal;

combining, using an optical combiner, the first monitoring signal and the second monitoring signal subsequent to application of the time-varying phase shift;

generating a feedback signal indicative of power of light output by the optical combiner, the feedback signal having a characteristic indicative of a current state of the photonic switch; and generating a control signal for controlling the photonic switch based on a combination of the feedback signal and an input signal indicative of a desired state of the photonic switch.

17. The method of claim 16, wherein the photonic switch is a 2×2 Mach-Zehnder Interferometer switch.

18. The method of claim 16, wherein time variation of the phase shift is sinusoidal.

19. The method claim 16, wherein the phase shifter is a thermal phase shifter, a carrier injection phase shifter, a carrier depletion phase shifter, a quantum-confined Stark effect phase shifter, or a Franz-Keldish effect phase shifter.

20. The method of claim 16, further comprising:

generating a third monitoring signal indicative of a signal present at the second optical input of the photonic switch;

generating a fourth monitoring signal indicative of a signal present at the second optical output of the photonic switch;

applying, using a second phase shifter, a second time-varying phase shift between the third monitoring signal and the fourth monitoring signal;

combining, using a second optical combiner, the third monitoring signal and the fourth monitoring signal subsequent to application of the second time-varying phase shift; and generating a second feedback signal indicative of power of light output by the second optical combiner, the second feedback signal having a second characteristic indicative of the current state of the photonic switch.

21. The method of claim 16, wherein, when the desired state corresponds to the signal present at the first optical input being routed to the first optical output, generating the control signals comprises adjusting the control signals in order to maximize amplitude of the feedback signal.

22. The method of claim 16, wherein, when the desired state corresponds to the signal present at the first optical input differing from the signal present at the first optical output, generating the control signals comprises adjusting the control signals in order to minimize amplitude of the feedback signal.

23. The method of claim 16, wherein the control signal is configured to cause the photonic switch to route the signal present at the first optical input to the first optical output in response to the desired state being a first desired state, and wherein control signal is configured to cause the photonic switch to route the signal present at the first optical input to the second optical output in response to the desired state being a second desired state.

24. The method of claim 16, wherein the control signal is applied to the phase shifter section to drive the photonic switch to the desired state based on the feedback signal.

* * * * *

UNITED STATES PATENT AND TRADEMARK OFFICE
CERTIFICATE OF CORRECTION

PATENT NO. : 10,209,537 B2
APPLICATION NO. : 15/261486
DATED : February 19, 2019
INVENTOR(S) : Ray Chung et al.

Page 1 of 1

It is certified that error appears in the above-identified patent and that said Letters Patent is hereby corrected as shown below:

In the Specification

In the Description:

Column 6, Line 24, "through a radians" should read --through $2\pi$ radians--

In the Claims

Column 15, Line 5, "shift to between" should read --shift between--

Signed and Sealed this
Seventh Day of May, 2019

Andrei Iancu
*Director of the United States Patent and Trademark Office*